United States Patent
Ur-Rehman et al.

(10) Patent No.: US 11,160,290 B2
(45) Date of Patent: Nov. 2, 2021

(54) METHOD FOR PRODUCING A FLAVORED MILK PRODUCT

(71) Applicant: fairlife, LLC, Chicago, IL (US)

(72) Inventors: Shakeel Ur-Rehman, Naperville, IL (US); Timothy Peter Doelman, Glencoe, IL (US); Sachin Harendrabhai Adhvaryu, Roswell, NM (US); Michael J. McCloskey, Demotte, IN (US)

(73) Assignee: fairlife, LLC, Chicago, IL (US)

( * ) Notice: Subject to any disclaimer, the term of this patent is extended or adjusted under 35 U.S.C. 154(b) by 0 days.

(21) Appl. No.: 13/655,375

(22) Filed: Oct. 18, 2012

(65) Prior Publication Data

US 2014/0113043 A1   Apr. 24, 2014

Related U.S. Application Data

(60) Provisional application No. 61/548,391, filed on Oct. 18, 2011.

(51) Int. Cl.
| | |
|---|---|
| *A23C 9/142* | (2006.01) |
| *A23C 9/156* | (2006.01) |
| *A23C 9/20* | (2006.01) |
| *A23C 9/12* | (2006.01) |
| *A23C 9/13* | (2006.01) |
| *A23C 9/15* | (2006.01) |

(52) U.S. Cl.
CPC ............ *A23C 9/142* (2013.01); *A23C 9/1206* (2013.01); *A23C 9/1307* (2013.01); *A23C 9/1422* (2013.01); *A23C 9/1427* (2013.01); *A23C 9/156* (2013.01); *A23C 9/1512* (2013.01); *A23C 9/20* (2013.01)

(58) Field of Classification Search
CPC ..... A23C 9/142; A23C 9/1206; A23C 9/1307; A23C 9/1422; A23C 9/1427; A23C 9/1512; A23C 9/156; A23C 9/20
USPC .......... 426/42, 580, 583, 590, 593, 490, 491
See application file for complete search history.

(56) References Cited

U.S. PATENT DOCUMENTS

| | | | | |
|---|---|---|---|---|
| 5,290,582 | A * | 3/1994 | Dressel et al. | 426/584 |
| 6,403,129 | B1 * | 6/2002 | Clark | A23C 9/1522 |
| | | | | 426/477 |
| 6,465,030 | B2 * | 10/2002 | Schroder | 426/330.2 |
| 8,449,938 | B2 * | 5/2013 | Tossavainen et al. | 426/580 |
| 2005/0196508 | A1 * | 9/2005 | Wang | 426/580 |
| 2007/0098871 | A1 * | 5/2007 | Dunker et al. | 426/580 |
| 2007/0166447 | A1 * | 7/2007 | Ur-Rehman et al. | 426/580 |
| 2009/0104320 | A1 * | 4/2009 | Gray | A23C 3/085 |
| | | | | 426/271 |
| 2011/0117243 | A1 * | 5/2011 | Ur-Rehman | A23C 7/043 |
| | | | | 426/42 |
| 2011/0200723 | A1 * | 8/2011 | Southwick | A23C 9/154 |
| | | | | 426/330.2 |
| 2013/0224338 | A1 * | 8/2013 | Darchuk | A23C 9/152 |
| | | | | 426/73 |
| 2013/0337138 | A1 * | 12/2013 | Purkayastha | A23L 2/60 |
| | | | | 426/548 |
| 2014/0037814 | A1 * | 2/2014 | Quinlan | A23L 2/60 |
| | | | | 426/548 |

OTHER PUBLICATIONS

Tate & Lyle, PUREFRUIT™ Monk Fruit Extract A Revolutionary Natural Sweetener, Nov. 2011.*

* cited by examiner

*Primary Examiner* — Leslie A Wong
(74) *Attorney, Agent, or Firm* — Winstead PC

(57) ABSTRACT

The present invention relates to low calorie and low carbohydrate nutritional milk compositions and milk products which are designed to include specific components of milk.

14 Claims, No Drawings

METHOD FOR PRODUCING A FLAVORED MILK PRODUCT

BACKGROUND OF THE INVENTION

Rising obesity rates among children and adolescents have prompted public health and government regulators as well as school administrators to take a critical look at all foods provided in schools. While the initial targets were sodas and other foods of minimal nutritional value sold in school vending machines, all foods and beverages sold in schools, including flavored milks, are now being reviewed for reductions in fat, sugar, sodium and calorie levels.

The call for change in the school environment, as it relates to the health and wellness of children, is presenting new challenges and opportunities for the milk industry. Today, school policies differ across the country, with many incorporating guidelines specific to flavored milk sold in schools, including milks offered through reimbursable school meal programs, a la carte lines, vending machines, student stores and fundraising activities.

To maintain its dominant place in schools, the milk industry is being encouraged to reformulate flavored milks with lower levels of sugar and calories that meet the changing guidelines of schools and parents, but still deliver the great taste that kids expect.

Thus, there is a need for a process for preparing compositions that comply with the guidelines set by school districts with respect to the amounts and types of sugars present in the milk and milk products served in school cafeterias. Additionally, there is also a desire among the general population for dairy compositions that provide the nourishment and taste of milk without the accompanying fat and calorie concerns. Thus, there is a need in the marketplace for dairy compositions that offer the wholesome nutrition of milk, while having a low calorie and low fat profile.

SUMMARY OF THE INVENTION

The claimed invention relates to nutritional milk compositions and milk products which are designed to include specific components of milk. The compositions of the present invention can optionally include non-essential, but nutritionally functional components. As used herein, the terms "components of milk" or "milk components" are intended to refer to individual components of milk such as, but not limited to, butter fat, milk protein, non-protein nitrogen, lactose and minerals. All percentages expressed herein are weight percentages (wt %), unless indicated otherwise.

The claimed invention relates to low calorie and low sugar nutritional milk compositions and milk products which are designed to include specific components of milk.

An embodiment of the invention is directed to a reduced-calorie flavored milk product comprising milk, a sweetener, and a flavoring agent, wherein the milk product is prepared by combining fat-free milk and an ultrafiltration retentate fraction and wherein the milk product has a carbohydrate to protein ratio ranging from 2:1 to 3:1.

A further embodiment of the invention is directed to a method for producing a reduced-calorie flavored milk product comprising the steps of: a. mixing fat-free milk, an ultrafiltration retentate fraction, a sugar source, a stabilizer, and a sweetener; b. adding a vitamin supplement to the product of step a; c. blending the product of step b for a desired amount of time; d. standardizing the product of step c to a desired amount of total solids; and e. heating the product of step d to at least 150° F. for at least 2 seconds.

DETAILED DESCRIPTION OF EXEMPLARY EMBODIMENTS

As used herein, the terms "dairy products" or "dairy compositions" refer to products or compositions comprising one or more milk components.

The complete nutritional milk compositions of the present invention can be provided as unflavored or flavored milk compositions.

As used herein the term "milk" includes fat-free milk, low fat milk, full fat milk, lactose-free milk (produced by hydrolyzing the lactose by lactase enzyme to glucose and galactose, or by other methods such as nanofiltration, electrodialysis, ion exchange chromatography and centrifugation technology), concentrated milk or dry milk. Fat-free milk is nonfat or skim milk product. Low-fat milk is typically defined as milk that contains from about 1% to about 2% fat. Full fat milk often contains about 3.25% fat. As used herein, the term "milk" is also intended to encompass milks from animal and plant sources. Animal sources of milk include, but are not limited to, human, cow, sheep, goat, buffalo, camel, llama, mare and deer. Plant sources of milk include, but are not limited to, milk extracted from soy bean. In addition, the term "milk" refers to not only whole milk, but also skim milk or any liquid component derived therefrom. By "whey" or "milk serum" is meant the milk component remaining after all or a substantial portion of the milk fat and casein contained in milk are removed.

As used herein, the term "milk protein concentrate" (MPC) is a milk-based ingredient containing more than 40% protein by weight on a dry matter basis. In embodiments of the invention, MPC can be used in a liquid form or in a dry form.

An embodiment of the invention provides a method for the separation of milk components starting with whole milk. Prior to entry into the membrane filtration system, the whole milk may be optionally passed through a mechanical separator in order to separate the cream from the remainder of the milk, or a microfiltration (MF) unit to remove fat. The separated cream is stored for future use. In certain embodiments of the invention the whole milk passes directly into the membrane systems without prior separation of the cream.

The skim milk is passed through an ultrafiltration (UF) membrane unit to produce a UF permeate component and a UF retentate component. In certain embodiments, the ultrafiltration step is performed using a membrane filtration system having a molecular weight cut-off of about 1-20 kDa at pressures ranging from about 45 to about 150 psi. The UF permeate is passed through a nanofiltration (NF) membrane unit to produce a NF permeate and a NF retentate. In certain aspects of the invention, the nanofiltration step is carried out using a membrane filtration system having a molecular weight cut-off of about 100-1000 Da at pressures ranging from about 150 to about 600 psi. The NF permeate and NF retentate are stored for future use.

In an embodiment, whole milk is separated into skim milk and cream, and the skim milk is subjected to a UF step and a NF step as discussed above. Following the NF step, the NF permeate is passed through a reverse osmosis system to produce a RO retentate and a RO permeate. The RO step employs a membrane filtration system having a molecular weight cut-off of about 100 Da at pressures ranging from about 450 to about 1500 psi. The RO permeate and RO retentate are stored for future use.

In an embodiment of the invention, one or more milk components are combined to produce compositions of the present invention. There are several embodiments of the invention including, without limitation, the compositions discussed and claimed below and the compositions set forth in the accompanying tables.

The compositions of the present invention are formulated by increasing the lactose content of a starting material such raw milk, fat-free, low fat or reduced fat milk, or any of the components generated by the separation process. The lactose content of the starting material is increased by adding fresh lactose concentrate derived from NF retentate.

In an embodiment of the invention, the NF retentate fraction is combined with the starting material and heat-treated at 146° F. for 30 minutes (or any other equivalent time and temperature combination), following which the composition is cooled to below 42° F. After the cool-down process, the composition is treated with lactase enzyme at 42° F. to 45° F. for 6-10 hours. The enzyme-treated composition is cooled to less than 40° F. for storage, packaging and shipment.

In an embodiment of the invention, the lactose content of raw milk is increased from 4.8 to 7.5 wt%, by adding an NF retentate or other high lactose fraction to the raw milk. In an embodiment of the invention, the final lactose content of an inventive composition is less than 20 g/8 ounce serving.

An embodiment of the invention is directed to increasing the concentration of milk protein in the compositions of the invention by the addition of milk protein concentrate or isolate, whey protein concentrate or isolate, or caseins. In certain instances, the addition of an ingredient that is high in protein is needed in compositions of the claimed invention because the addition of NF retentate to compositions if the invention can dilute the protein concentration.

In other embodiments of the invention, NF retentate (13-20 wt % total solids) is further concentrated by reverse osmosis to 21 to 30 wt % total solids. The RO-concentrated NF-retentate fraction is added to a composition comprising milk or milk components to increase the lactose content of the composition.

Other "high lactose" fractions that may be added to milk or milk components in order to increase their lactose content includes UF permeate.

In an embodiment of the invention, the lactose present in a composition is hydrolyzed using lactase enzyme to glucose and galactose to increase sweetness. Additionally, this results in a lactose-free composition that has "no added" sugar.

In certain embodiments of the invention, the compositions are low fat compositions (2% or less) or fat-free compositions.

In certain embodiments, the sweetness of the compositions can be increased by treating the glucose generated by lactose hydrolysis, with glucose isomerase enzyme. Thus, the sweetness of the compositions may be increased without adding any additional sugar.

In certain embodiments of the invention, sweetness of compositions may be increased by adding non-sugar sweeteners such as Stevia, rebiana, erythritol or monk juice concentrate.

In other embodiments of the invention, a sugar source such as cane sugar, beet sugar, fruits, fruit juice, concentrated fruit juice, corn sweeteners, maple sugar, lactose and fructose are added to compositions of the invention. In certain embodiments of the invention, one or more sugar sources can be added.

In some embodiments of the invention, the compositions of the invention comprise one or more stabilizers selected from the group consisting of guar gum, locust bean gum, xanthan gum, carageenan, alginate, cellulose gum and pectin.

In certain embodiments of the invention, vitamins such as vitamin A and vitamin D are added to certain compositions prepared in accordance with processes of the invention.

Embodiments of the invention contain one or more of the nine essential nutrients of milk namely, calcium, vitamin A, vitamin D, vitamin B12, protein, potassium, riboflavin, niacin and phosphorous. These nutrients are considered to be key components of the nutritive needs of children. Furthermore, milk-based beverages are an excellent vehicle for ensuring that these nutritional needs are met.

In certain embodiments of the invention, the compositions are flavored using one or flavoring substances including chocolate, cocoa, strawberry and vanilla flavoring.

An embodiment of the invention is directed to a reduced-calorie flavored milk product comprising fat-free milk, an ultrafiltration retentate fraction, a sugar source, and a flavoring agent, wherein the milk product has less than 135 calories per serving. In other embodiments of the invention, the milk product has less than 110 calories per serving.

Another embodiment of the invention is directed to a wherein the milk product containing at least 94% skim milk, about 0.002-0.03% sweetener, and about 0.5-0.7% flavoring agent by weight.

An embodiment of the invention is directed to the manufacture of a reduced sugar, fat-free, lactose-hydrolyzed milk from reverse osmosis concentrated milk. In this embodiment, raw milk at a temperature of less than 45° F. is subjected to a separation process for the removal of cream, which results in the production of a fat-free milk. In certain embodiments, the cream is removed using centrifugal separators. In other embodiments, the cream is removed using a membrane filtration process like microfiltration.

The fat-free milk produced following the removal of cream is subjected to a reverse osmosis (RO) process. The RO process employs a membrane filtration system having a molecular weight cut-off of about 100 Da at pressures ranging from about 450 to about 1500 psi. In certain embodiments, the fat-free milk is concentrated during the reverse osmosis process by a factor of 2-3 fold.

In certain embodiments of the invention, a portion of the RO concentrated fat-free milk is combined with a UF retentate fraction to form a fat-free, protein-enriched composition.

In certain embodiments of the invention, the RO concentrated fat-free milk-based composition (either with or without the addition of UF retentate) is treated with lactase enzyme. In some embodiments of the invention, the lactase enzyme treatment is carried out at 42° F. to 45° F. for 6-10 hours.

The lactase-enzyme treated, fat-free milk composition is combined with sweeteners, stabilizing agents and flavoring agents to form a flavored concentrated base.

In certain embodiments, the flavored concentrated base is subjected to regular pasteurization or ultrahigh temperature (UHT) pasteurization. Following pasteurization, the flavored concentrated base is filled into bags or boxes for storage and/or transportation. The flavored, concentrated, fat-free milks are reconstituted to single strength flavored milks with sterile water.

The flavored concentrated base compositions produced in accordance with processes of the claimed invention comprise less than 0.5 wt % of fat, between 6.9 wt% to 7.1 wt % of protein and between 18 wt % and 20 wt % of carbohydrates (primarily sugars).

In certain embodiments of the invention, the flavored, concentrated, fat-free milks are reconstituted to single strength flavored milks. the reconstituted compositions comprise less than 0.22 wt % of fat, between 3 wt % to 4 wt % of protein and between 13 wt % to 14 wt % of total solids. The range of carbohydrates (primarily sugars) that are present in the reconstituted compositions of the claimed invention is 7.8 wt% to 8.2 wt %.

Examples of concentrated base compositions prepared by the processes of the claimed invention are set forth below:
  a. A vanilla and chocolate flavored base composition prepared by mixing reverse osmosis-concentrated skim milk and UF retentate of skim milk, along with vanilla and chocolate flavorings, the base composition containing 0.22 wt % fat, 18 wt % sugar, 7.5% protein, and 29.3 wt % total solids.
  b. A strawberry flavored base composition prepared by mixing reverse osmosis-concentrated skim milk and UF retentate of skim milk, along with strawberry flavorings, the base composition containing 0.22 wt % fat, 19.1 wt % sugar, 7.7% protein, and 28.2 wt % total solids.
  c. A vanilla flavored base composition prepared by mixing reverse osmosis-concentrated skim milk and UF retentate of skim milk, along with vanilla flavoring, the base composition containing 0.22 wt % fat, 19.09 wt % sugar, 7.74% protein, and 28.22 wt % total solids.

In an embodiment of the invention, the concentrated base compositions of the claimed invention have a carbohydrate to protein ratio of ranging from 2:1 to 3:1. In a preferred embodiment, the concentrated base composition has a carbohydrate to protein ratio of 2.4:1.

In an embodiment of the invention, the flavored concentrated base is reconstituted with a diluent to create a dairy beverage that is ready for consumption. In certain embodiments, the diluent is sterile water. In other embodiments of the invention, the diluent that is used to reconstitute the flavored concentrated base is RO permeate.

A further embodiment of the invention is directed to a method for producing a reduced-calorie flavored milk product comprising the steps of: a. mixing reverse-osmosis concentrated fat-free milk, an ultrafiltration retentate, a sugar source, and a stabilizer; b. adding a vitamin supplement to the product of step a; c. blending the product of step b for a desired amount of time; d. standardizing the product of step c to a desired amount of total solids; and e. heating the product of step d to at least 150° F. for at least 2 seconds. In certain embodiments of the invention, the milk product is heated to about 280 to 300° F. for at least 2 seconds in step e. In other embodiments of the invention, the milk product is heated to about 160 to 180° F. for about 15 to 30 seconds in step e. In certain embodiments of the invention, the product of step e. is reconstituted with a diluent to form a dairy beverage that is ready for consumption. In certain embodiments, the diluent is sterile water. In other embodiments of the invention, the diluent that is used to reconstitute the flavored concentrated base is RO permeate.

The compositions of the present invention may be concentrated by any number of methods including but not limited to evaporation, and membrane processes like reverse osmosis, in order to provide the milk composition in a concentrated composition or format. The compositions may be concentrated by known methods in the art including, but not limited to, evaporation, to provide the milk components of the compositions in a more concentrated format.

Although the claimed invention has certain preferred embodiments, it will be obvious to those skilled in the art that various changes and modifications may be made therein without departing from the invention, and all such changes and modifications are intended to fall within the true spirit and scope of the invention.

What is claimed is:

1. A method for producing a flavored milk product comprising the steps of:
  a) subjecting a milk product starting material to a reverse osmosis process to concentrate the milk product starting material to form a concentrated milk product;
  b) adding nanofiltration retentate to the concentrated milk product to increase the lactose concentration of the concentrated milk product;
  c) adding milk protein concentrate to the concentrated milk product, wherein the milk protein concentrate contains more than 40% protein by weight on a dry matter basis;
  d) combining the product of step c) with a sweetener, a stabilizing agent, and a flavoring agent to form a flavored concentrated base;
  e) heating the flavored concentrated base to at least 150° F. for at least 2 seconds; and
  f) reconstituting the flavored concentrated base with a diluent to form a flavored milk product having a carbohydrate concentration of 7.8 wt % to 8.2 wt %.

2. The method of claim 1, wherein, prior to step a), the milk product starting material is passed through a mechanical separator to separate cream from the milk product starting material.

3. The method of claim 1, wherein the milk product starting material in step a) is concentrated between 2-3 fold.

4. The method of claim 2, further comprising, prior to step b), combining the milk product starting material of step a) with a UF retentate fraction to form a fat-free, protein-enriched composition.

5. The method of claim 1, wherein the product of step b) comprises less than 0.5 wt % of fat, between 6.9 wt% to 7.1 wt % of protein, and between 18 wt % and 20 wt % of carbohydrates.

6. The method of claim 1, wherein the product of step e) comprises less than 0.22 wt % of fat, between 3 wt % to 4 wt % of protein, between 13 wt % to 14 wt % of total solids, and between 7.8 wt % to 8.2 wt % carbohydrates.

7. The method of claim 6, wherein the heating step is an ultrahigh temperature (UHT) pasteurization process.

8. The method of claim 1, wherein the flavored concentrated base comprises less than 0.5 wt % of fat, between 6.9 wt % to 7.1 wt % of protein and between 18 wt % and 20 wt % of carbohydrates.

9. The method of claim 1, wherein the stabilizing agent is selected from the group consisting of locust bean gum, xanthan gum, carageenan, and alginate.

10. A method for producing a flavored milk product comprising the steps of:
  a) subjecting a milk product to a reverse osmosis process to form a concentrated milk product;
  b) mixing the concentrated milk product of step a) with an ultrafiltration retentate, a sugar source, a flavoring agent and a stabilizing agent to form a first milk product;
  c) adding a vitamin supplement to the first milk product of step b) to form a second milk product;

d) heating the second milk product of step c) to at least 150° F. for at least 2 seconds to form a heated second milk product; and e) reconstituting the heated second milk product of step d) with a diluent comprising reverse osmosis permeate to form a flavored milk product having a carbohydrate concentration of 7.8 wt % to 8.2 wt %.

11. The method of claim 10, wherein the stabilizing agent is selected from the group consisting of locust bean gum, xanthan gum, carageenan, and alginate.

12. The method of claim 10, further comprising adding milk protein concentrate to the first milk product.

13. The method of claim 12, wherein adding the milk protein concentrate to the first milk product comprises adding at least one of milk protein concentrate, milk protein isolate, whey protein concentrate, whey protein isolate, and casein.

14. The method of claim 10, further comprising adding protein to the flavored milk product by adding at least one of milk protein concentrate, milk protein isolate, whey protein concentrate, whey protein isolate, and casein.

\* \* \* \* \*